No. 728,528. PATENTED MAY 19, 1903.
F. C. WEBER.
PROCESS OF TREATING KAOLIN FOR THE PRODUCTION OF
CARBORUNDUM AND ALUMINA.
APPLICATION FILED NOV. 3, 1902.
NO MODEL.
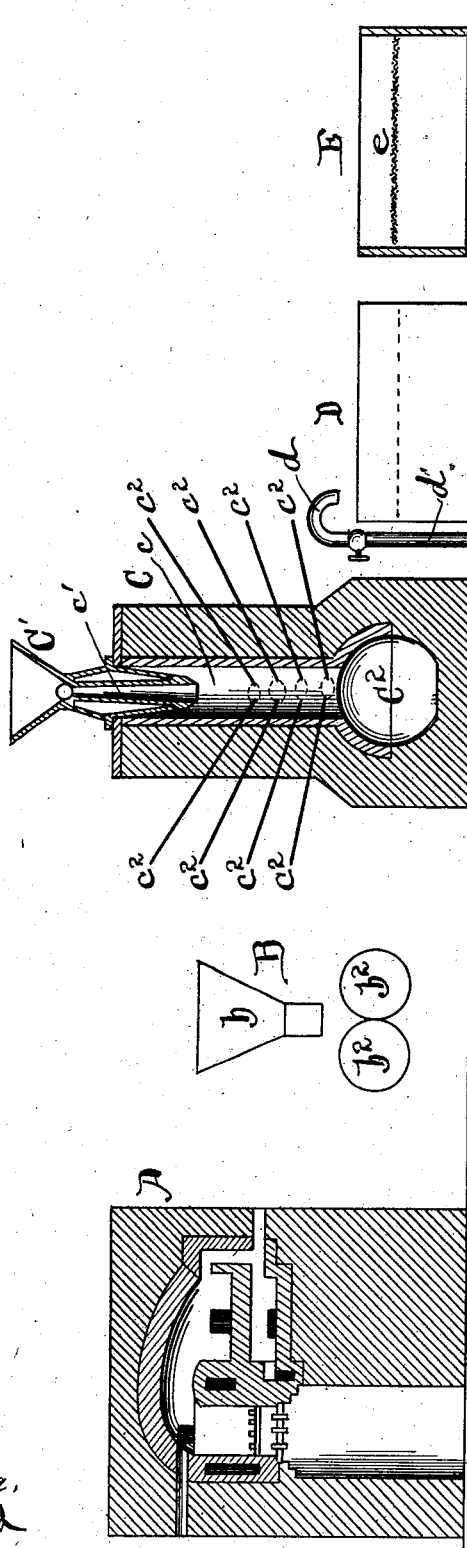
Witnesses
Samuel W. Banning,
Oscar W. Bond
Inventor
Frederick C. Weber
By Banning & Banning
Att'ys.

No. 728,528. Patented May 19, 1903.

UNITED STATES PATENT OFFICE.

FREDERICK C. WEBER, OF CHICAGO, ILLINOIS.

PROCESS OF TREATING KAOLIN FOR THE PRODUCTION OF CARBORUNDUM AND ALUMINA.

SPECIFICATION forming part of Letters Patent No. 728,528, dated May 19, 1903.

Application filed November 3, 1902. Serial No. 129,999. (No specimens.)

*To all whom it may concern:*

Be it known that I, FREDERICK C. WEBER, a citizen of the United States, residing at Chicago, in the county of Cook and State of Illinois, have invented a certain new and useful Improvement in Methods or Processes of Treating Kaolin or Fire-Clay for the Production of Crystalline Carborundum and Amorphous Alumina, of which the following is a specification.

The only known source of crude material which can be utilized in the production of metallic aluminium is kaolin in unlimited quantities or fire-clay, and in order to attain the result of making metallic aluminium from the material named such material must be separated for the alumina to be free from the silica which is chemically combined with the alumina, and by this is meant not only that the kaolin or fire-clay must be dissociated, separating the alumina from the silica, but such separation must be of a nature and in such manner as to leave a pure alumina—that is, alumina free from water, iron, silica, and other impurities—so that the produced metallic aluminium shall be a metal as pure as the metal made from the mineral bauxite.

The present invention has for its object the attainment in a practical and successful manner of the conversion of kaolin into the condition of crystalline carborundum and amorphous alumina, for further treatment of the amorphous alumina and the production of pure metallic aluminium; and the invention consists in the method or process and the various steps thereof hereinafter described, and pointed out in the claims.

In carrying out the method or process of the present invention kaolin having the chemical formula $Al_2O_3 + 2SiO_2 + 2H_2O$ is charged into a suitable furnace, preferably a reverberatory furnace, and roasted therein to an extent to dissociate the kaolin molecule, driving off the water, leaving anhydrous aluminium silicate, $(Al_2O_3 + 2SiO_2,)$ for which purpose a temperature of 360° centigrade for the furnace is required in order to have the temperature high enough to effectually drive off the non-combined and chemically-combined water, leaving the remaining portion of the kaolin as anhydrous aluminium silicate in the form of a clinker on the hearth of the furnace. The produced clinker of anhydrous aluminium silicate is removed from the furnace and ground in a suitable mill or otherwise comminuted, so as to be in the condition of a coarse powder. A mill suitable for the grinding can be a Cornish type of mills for grinding purposes having rolls of different degrees of hardness, one roll being of nickel-steel hard and tough and the other roll of carbon-steel tempered to be softer, by which formation of rolls the acting faces of the rolls become rough and uneven, and such roughness and unevenness operates to catch and bite the clinkers and effectually breaks and grinds the material into the condition required, it being understood that for powdered or fine material after the grinding a sifter of any suitable construction is to be used for separating the finely granulated or powdered material from the coarser. The coarsely-powered anhydrous aluminium silicate is then mixed with coarsely-powdered coke in atomic proportions to produce when the mixture is passed through an electric arc or is subjected to the temperature of the electric arc molecular changes and products consisting of $$2(Al_2O_3 + 2SiO_2) + 21C = Al_4C_3 + 4SiC + 14CO$$

as the resultant. The subjecting of the mixture of coarsely-powdered anhydrous aluminium silicate and coarsely-powdered coke in atomic proportions to the temperature of the electric arc heats the material of the charge to that degree which is required to dissociate the anhydrous aluminium-silicate molecules and furnish nascent atoms of aluminium, silicon, and oxygen, which elements at the temperature of the electric arc (the required amount of caloric being present) rearrange themselves to form the new molecules silicon carbid and aluminium carbid and carbon monoxid. This resultant action from subjecting the charge of material to the action of the electric arc arises from the fact, which enables this step of the process to be carried out, that the temperature at which silicon carbid and the temperature at which aluminium carbid are each produced is so near together that the two resultants can be made together in an electric furnace and in this manner and by this means provide for their separation as usual in chemical operations by forming methane in the further treatment or steps of the process.

The resulting solid mass of aluminium carbid and silicon carbid after treatment by the electric arc is removed and thrown into a tank containing water, where a chemical change takes place and the aluminium carbid is decomposed according to the following equation:

$$Al_4C_3 + 12H_2O = 3CH_4 + 2Al_2(OH)_6,$$

forming methane and aluminium hydrate, of which the gaseous methane is allowed to go to waste, leaving the aluminium as a hydrate. This action results in separating the crystalline carborundum from the mass of aluminium hydrate by reason of the inertness of the crystalline carborundum, and the crystalline carborundum will settle to the bottom of the tank.

The resultant aluminium hydrate is separated from the crystalline carborundum by subjecting the material to a washing and filtering process by which the aluminium hydrate is washed out and the liquid containing the aluminium hydrate is then to be evaporated to dryness, leaving the aluminium hydrate in a dried condition, and in this condition the aluminium hydrate is placed upon the hearth of preferably a reverberatory furnace and subjected to a heat of 560° centigrade for the furnace, resulting in driving off of all the molecular or chemically combined water and the production of anhydrous alumina ($Al_2O_3$) or amorphous alumina, which can be subjected to the heat of the electric arc in any usual and well-known way and then reduced in a fluorid bath, as usual in producing metallic aluminium.

The various steps of the method or process of the present invention may be stated as follows: subjecting kaolin of the nature stated to a roasting to drive off the water and leave anhydrous aluminium silicate, reducing the clinker of anhydrous aluminium silicate to a coarse powder, mixing the coarsely-powdered anhydrous aluminium silica with coarsely-powdered coke in atomic proportions, subjecting the mixture of anhydrous aluminium silicate and coke, both in a powdered condition, to the action of an electric arc, thereby producing silicon carbid and aluminium carbid and carbon monoxid, depositing the aluminium carbid and silicon carbid in water and forming thereby methane and aluminium hydrate, separating the aluminium hydrate from the crystalline carborundum by a washing process, evaporating the liquid containing the aluminium hydrate to a condition where dried aluminium hydrate only remains, and then subjecting the dried aluminium hydrate to a heat sufficient to produce anhydrous alumina or amorphous alumina as the final resultant of the process of the invention for the production of pure metallic aluminium.

The method or process of the present invention enables the crude material—kaolin or fire-clay—to be successfully and practically treated so as to produce as a resultant anhydrous alumina or amorphous alumina for use in making pure metallic aluminium, and by the method or process of the present invention the anhydrous alumina or amorphous alumina is produced at a cost which will allow of its use in making pure metallic aluminium without any extra treatment for the removal of iron or other impurities, as the anhydrous alumina or amorphous alumina from kaolin or fire-clay is free from iron and other impurities which would interfere with its being practically used for making metallic aluminium. It is to be understood that the term "coke" is intended to include any suitable form of carbon.

The necessary appliances for carrying out the process of the invention are illustrated in the drawing, in which the figure represents the several appliances in the order in which they are used in carrying out the steps of the process.

A is a reverberatory furnace of any usual and well-known form of construction in which kaolin is charged to be reduced to a clinker.

B is a grinding mill or rolls of the general type of what is known or termed "Cornish mills or rolls," the mill or rolls being shown essentially in outline. The clinkers from the reverberatory furnace are placed in the hopper $b$ and are fed therefrom between the crushing-rolls $b'$ and $b^2$, one of which is harder than the other, as hereinbefore described.

C is an electric furnace into which the powdered clinker after it leaves the mill or rolls and is mixed with coke is transformed into silicon carbid, aluminium carbid, and carbon monoxid.

The furnace C has a passage or chamber $c$, into which the carbons $c^2$ project, so as to form an arcing space between the ends of the carbons. Through this space the powdered clinker and the coke are fed. The powdered clinker and the coke are deposited in a hopper $C'$ and are fed from the hopper through a delivery-spout $c'$, and with the passage of the powdered material through the arcing space of the carbons the resultant falls into the hopper $C^2$, from which it can be removed in any suitable manner.

D is a tank containing water, into which the resultant from the electric furnace in the shape of a solid mass of aluminium carbid and silicon carbid is placed for the chemical change to take place, by which the aluminium carbid is deposited, forming methane and aluminium hydrate. The water, as shown, is supplied to the tank through a discharge-nozzle $d$, connected with a valve-controlled pipe $d'$, leading to a suitable source of water-supply.

E is a tank in which the resultant aluminium hydrate and the crystalline carborundum are separated, for which purpose the tank has a filtering-screen $e$, through which the liquid containing the aluminium hydrate passes into the lower portion of the tank, which liquid is subsequently to be evaporated to dryness, so as to leave aluminium hydrate in a dried condition, which aluminium hydrate is to be placed on the hearth of a reverberatory furnace, like the furnace A or other furnace, and subjected to heat, as hereinbefore described.

What I regard as new, and desire to secure by Letters Patent, is—

1. The method or process of treating kaolin or fire-clay and producing crystalline carborundum and amorphous alumina, which consists in first driving off under heat both the non-combined and chemically-combined water from the kaolin, and thereby forming a clinker of anhydrous aluminium silicate, then powdering the clinker and mixing the same in atomic proportions with powdered coke and treating the powdered mixture under heat and thereby forming aluminium carbid and silicon carbid and carbon monoxid, substantially as described.

2. The method or process of treating kaolin or fire-clay and producing crystalline carborundum and amorphous alumina, which consists in first driving off under heat both the non-combined and the chemically-combined water from the kaolin, and thereby forming a clinker of anhydrous aluminium silicate, then powdering the clinker and mixing the same in atomic proportions with powdered coke and subjecting the mixture of powdered anhydrous aluminium silicate and coke to the temperature of an electric arc, and thereby forming aluminium carbid, silicon carbid and carbon monoxid, then washing the same and forming methane and alumina hydrate and driving off under heat the molecular water, substantially as described.

3. The method or process of treating kaolin or fire-clay and producing crystalline carborundum and amorphous alumina, which consists in dissociating under heat the kaolin molecules, driving off the water and forming a clinker of anhydrous aluminium silicate, powdering the clinker of anhydrous aluminium silicate and mixing the same in atomic proportions with powdered coke, subjecting the mixture of powdered anhydrous aluminium silicate and coke to the temperature of an electric arc, forming silicon carbid and aluminium carbid and carbon monoxid, treating the solid mass of aluminium carbid and silicon carbid thus formed with water and forming methane and alumina hydrate, substantially as described.

4. The method or process of treating kaolin or fire-clay and producing crystalline carborundum and amorphous alumina, which consists in dissociating under heat the kaolin molecules, driving off the water and forming a clinker of anhydrous aluminium silicate, powdering the clinker of anhydrous aluminium silicate and mixing the same in atomic proportions with powdered coke, subjecting the mixture of powdered anhydrous aluminium silicate and coke to the temperature of an electric arc, forming silicon carbid and aluminium carbid and carbon monoxid, treating the solid mass of aluminium carbid and silicon carbid thus formed with water forming methane and aluminium hydrate, washing out the aluminium hydrate from the crystalline carborundum formed and then drying the aluminium hydrate and forming anhydrous or amorphous alumina, substantially as described.

5. The process herein described of treating kaolin or fire-clay and producing crystalline carborundum and amorphous alumina, which consists in forming silicon carbid and aluminium carbid from kaolin, then subjecting the resultant product to the action of water forming methane and aluminium hydrate, and then separating by washing the aluminium hydrate from the crystalline carborundum, substantially as described.

6. The process herein described of treating kaolin or fire-clay and producing crystalline carborundum and amorphous alumina, which consists in forming silicon carbid and aluminium carbid from kaolin, then subjecting the resultant to the action of water forming methane and aluminium hydrate, then washing and thereby separating the aluminium hydrate from the crystalline carborundum, and then drying the aluminium hydrate and subjecting the same to heat driving off the molecular or chemically-combined water and forming anhydrous or amorphous alumina, substantially as described.

FREDERICK C. WEBER.

Witnesses:
OSCAR W. BOND,
PAULINE BECKMAN.